Sept. 26, 1961    G. W. MOODY    3,001,783
SPRING SUSPENSION DEVICES FOR MOTOR VEHICLES
Filed Oct. 6, 1958    2 Sheets-Sheet 1

INVENTOR.
GEORGE WILLIAM MOODY
BY
*Leeman, Leeman, & McCulloch*
ATTORNEYS

Sept. 26, 1961 G. W. MOODY 3,001,783
SPRING SUSPENSION DEVICES FOR MOTOR VEHICLES
Filed Oct. 6, 1958 2 Sheets-Sheet 2

INVENTOR.
GEORGE WILLIAM MOODY

BY
*Furman, Furman, & McCulloch*

ATTORNEYS

United States Patent Office 3,001,783
Patented Sept. 26, 1961

3,001,783
SPRING SUSPENSION DEVICES FOR MOTOR VEHICLES
George William Moody, Lansing, Mich., assignor to Universal Air Lift, Inc., Lansing, Mich., a corporation of Michigan
Filed Oct. 6, 1958, Ser. No. 765,578
7 Claims. (Cl. 267—34)

This invention relates to bumper assemblies and the like for yieldably maintaining a pair of relatively movable members in spaced relation and more particularly to units which can be employed between the chassis cross frame member and lower control arm of a vehicle suspension system which uses air springs, during shipping of the vehicle from one place to another when the air suspension system of the vehicle is disabled.

When vehicles employing air suspension systems are shipped by haul-away truck, experience has shown that the air springs cannot be relied upon to support the weight of the vehicles or cushion road shock at a time when the vehicle engines are not operating, because slight leaks are inevitably present in most systems which over the period of time required for transit in many instances bleed the system of much of its pressure fluid. Accordingly, the systems have been bled out prior to shipment and props have been employed to more or less fix the chassis of the vehicle in supported position. These props which have been employed to support the weight of the chassis during transit, since obviously the chassis cannot be permitted to bottom, have been of a rigid nature unsuited to handling the jounces transmitted to the vehicles in transit, with the result that severe strains have been placed upon the vehicles because of the inability of the props to "cushion."

The instant invention is concerned with what is termed a shipping bumper assembly which is designed so that it will have an immediate and variant response to the load placed upon it in accordance with the rate of imposition and force of the load. It is to be borne in mind that, with the air spring suspension system depressurized to maintain the balance of the support system which is used, the shipping bumper units which form the subject matter of the instant invention must bear the full weight of the vehicle and also the force of the road shock and must be sturdily constructed, rugged assemblies.

It is a prime object of the present invention to provide a shipping bumper assembly capable of functioning in the manner described which can be very easily and conveniently installed in position without necessitating changes or modifications in the vehicle suspension systems of the vehicles with which it is employed.

A further object of the invention is to provide a unit of the character described which need not be attached to the suspension system at both ends and which can be inflated prior to installation.

Another object of the invention is to provide an inflatable bumper unit having a sealed pressure chamber which, upon inflation, does not for practical purposes increase in length.

A still further object of the invention is to provide a bumper unit which does not require removal of the welding burrs from or smoothing of the free surface which engages it, for its protection.

Another object of the invention is to present a unit of the type described which presents a deformable engagement surface which can accommodate the contour of the chassis or running gear member.

Another object of the invention is to provide a shipping bumper assembly which, under compression, performs in a unique manner and has many of the desirable attributes of high variable rate springs.

A further object of the invention is to provide a shipping bumper assembly incorporating a coil spring which permits the development of large compression loads between the frame and axle of the vehicle suspension system without requiring the coil spring to withstand axial extension to the limit of axle travel.

Still a further object of the invention is to provide a shipping bumper assembly of practical and economical construction which can be supplied at a sufficiently low price so as to be readily saleable for the purpose for which it was designed.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

Figure 1:
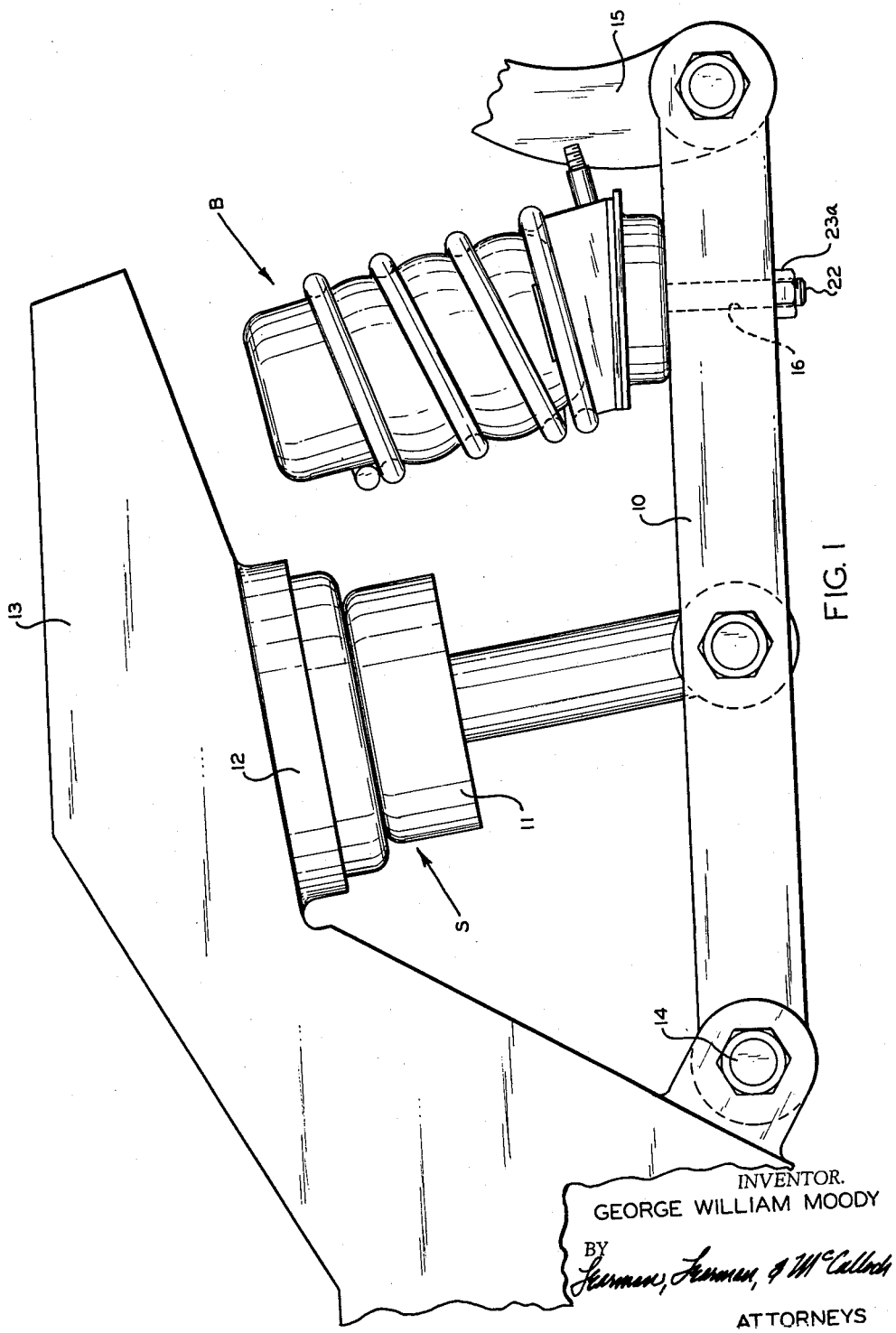
FIGURE 1 is a fragmentary, transverse elevational view showing the bumper unit installed in position adjacent to one of the air springs at the front end of the vehicle, the vehicle suspension system being shown with the air spring or diaphragm member in inflated condition to permit easy assembly of the bumper unit in position.

Referring now to the accompanying drawings, and more particularly to FIGURE 1 thereof, in the first instance, wherein I have shown fragmentarily a part of a front wheel suspension, a letter B generally indicates a shipping bumper unit, which is shown mounted in position on the lower control arm 10 of the suspension system adjacent to the air spring generally indicated at S. The spring S will not be described in detail, since it forms no part of the instant invention, however, it is of the conventional type which employs a plunger 11 fixed to a diaphragm 12 which forms the under wall of an air chamber. For purposes of this specification, the air spring may be assumed to be of the same construction as that shown in British Patent No. 773,069, published April 17, 1957. The suspension system with which the bumper unit, which will presently be described in detail, is employed may vary considerably and for purposes of illustration a conventional system has been shown. The various parts of the system will be readily recognized and include, beside the lower control arm 10, the vehicle chassis frame member 13 to which the control arm 10 is pivotally connected as at 14 and the steering knuckle support member 15. It is usual practice to provide in such a front suspension system a solid rubber bumper member outward of the air spring S and an opening 16 is provided in the lower control arm 10 to accommodate a bolt which secures this bumper in position, as in the aforementioned British patent. The shipping bumper unit which forms the subject matter of the instant application is so designed that it can be secured in position by utilizing opening 16 without requiring any change whatsoever in the suspension member shown.

Figure 3:
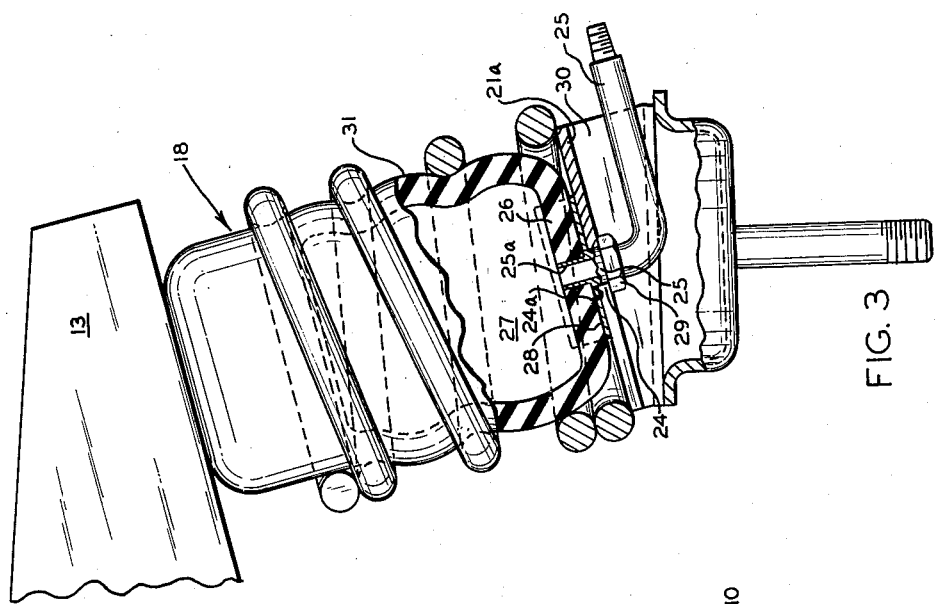
FIGURE 3 is a view similar to FIGURE 2 illustrating the manner in which the bumper units are compressed under the load of the vehicle chassis.
Figure 2:
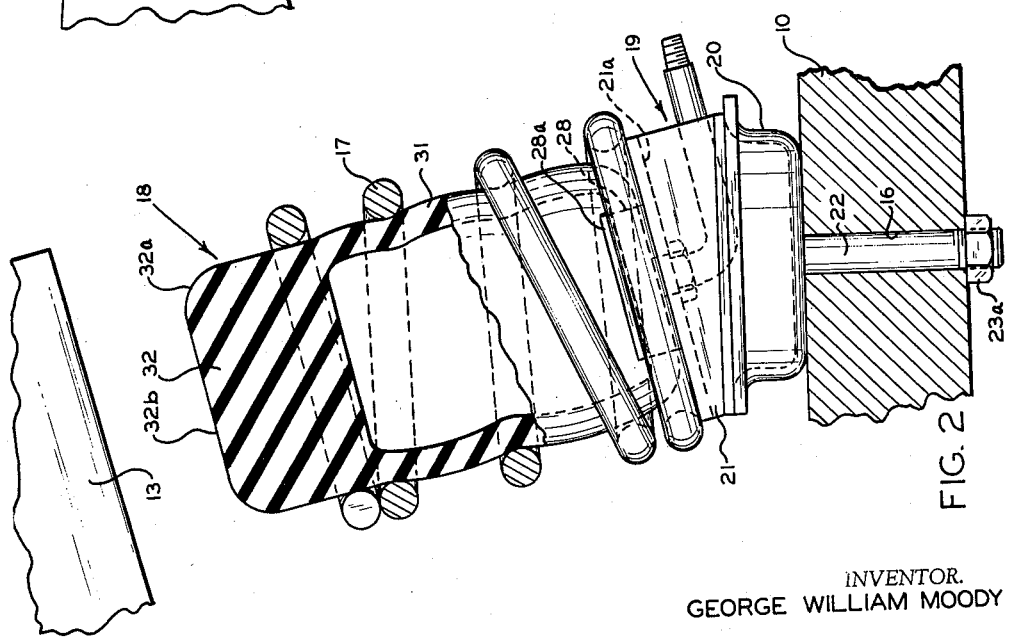
FIGURE 2 is an enlarged, partly sectional view illustrating in detail the construction of the bumper assembly.

FIGURES 2 and 3 illustrate the construction of the shipping bumper assembly in detail and it will be seen that each bumper unit comprises a coil spring 17 and an inflatable, cylindrical, rubber bag generally indicated at 18. The spring 17 and bag 18, which is disposed within spring 17, are supported in position by a base member 19, which comprises an annular, flanged, cup-shaped member 20 and an upper, inversely disposed, cup-like member 21 which is welded or otherwise suitably secured thereto. Extending from the member 20 is an integral threaded post 22 which is received in opening 16 and is secured in position by nut 23a. The upper pedestal member 21 has a flat top surface 21a disposed at an angle conforming generally with the plane of extension of chassis frame member 13, and a U-shaped spring retainer member 28 having flanges 28a which overlie the lower convolution of spring 17 is provided to secure the spring 17 in position thereon. The lower flat wall of retainer 28 supports the lower end of the bag and the upper engagement surface of bag 18 remains flat and does not assume a convex shape when bag 18 is inflated, as will later be apparent.

Provided in the surface 21a and retainer 28 are openings 24 and 24a, respectively, through which a valve stem 25 leading from the lower end wall 26 of the bag extends. The valve stem 25, which is of conventional design, has a very snugly received, reduced portion 25a leading through the lower wall 26 of the bag 18 into communication with the air chamber 27 provided in the bag, which is rigidly fixed in the lower wall 26 of the bag. A nut 29 threaded on valve stem 25 can be employed to secure the bag and container 18 in position on pedestal member 21. It will be seen that the valve stem 25 is angular and leads out an opening 30 provided in the upper pedestal member 21 at one side thereof. The front end of valve stem 25, of course, carries the usual check valve by means of which the bag 18 can be inflated or deflated.

The side wall or side walls 31 of the envelope or bag 18 are expansible when the chamber 27 is inflated and, since the outer diameter of bag 18 is of the same diameter as the internal diameter of the convolutions of spring 17, will be expanded out between the convolutions of spring 17 when a fluid under pressure is admitted to chamber 27. When the bag 18 is inflated, the side walls 31 of the bag form alternating root portions and node portions, the node portions providing individual supporting surfaces for the convolutions of spring 17. At its upper end, chamber 27 is bounded by a substantially inexpansible wall portion 32 which, it will be noted, projects a considerable distance beyond the uppermost convolution of spring 17. This wall portion 32 prevents endwise expansion of the cylinder 18 under inflation of chamber 27 and forms the surface which is engaged by the chassis frame member 13. Thus, for practical purposes the only expansion which occurs when bag 18 is inflated is a lateral expansion of the elastic side wall or side walls 31 out between the convolutions of spring 17. The side wall 31 is prevented from elongating by the lateral expansion thereof between the convolutions of the spring. The end wall portion 32 is of such stability that it will not buckle and it will be noted that the uppermost convolution of spring 18 surrounds the lower portion of end wall portion 32 adjacent chamber 27, so that spring 17 tends to maintain the upper end wall portion 32 in axial alignment extending in a direction substantially normal to the planes of chassis frame member 13 and upper pedestal surface 21a. The spring 17 thus functions to tie end wall portion 32 to the considerably less thick and elastic side wall or walls 31 of the inflatable envelope 18 and functions to maintain the lateral stability of side wall 31, which would otherwise buckle readily in a lateral direction. Inflation of chamber 27 to cause portions of the side wall 31 to expand out between the convolutions of spring 17 also secures the bag in position within spring 17, of course. The upper end of end wall portion 32 is rounded off as at 32a, however, a flat surface 32b of substantial area remains.

The containers or bags 18 may be on the order of 5 inches in length and may be inflated with 80 to 120 pounds per square inch of pressure to bear part of a distributed load which will be in the neighborhood of one ton and more, however, their dimensions may vary in accordance with the use to which they may be put.

While end portion 32 is not expandable, it is deformable slightly to conform to the surface of frame member 13, which engages it, and will withstanding gouging by welding burrs or the like without any danger of losing the air or pressure fluid in chamber 27. With the upper convolution of spring 17 disposed around the lower portion of end wall 32, end wall 32 cannot hinge about its juncture to side wall 31 and will not be displaced laterally. Further, since the end wall 32 is of a substantially hard nature and is not laterally deformable since it is not hollow there is no necessity for attaching it to the chassis frame member. Since neither spring 17 nor bag 18 is connected to chassis frame member 13, there is no danger of a rebound condition occurring which would axially extend either member to the point of rupture. End wall portion 32 provides a relatively stable member which prevents engagement of the spring 17 with frame member 13 and insures that the convolutions of spring 17 will not be damaged.

Installing the bumper unit B is, of course, the very simplest of tasks with the air springs S in inflated condition, as in FIGURES 1 and 2, because no connection need be made to chassis frame member 13. Further, because this is the case, inflation of the bumper unit B is accomplished prior to installation and it is not necessary to provide a portable source of compressed air which is shiftable to various position to inflate the bags 18 on each vehicle. Once the shipping bumper units are in position, air is bled from diaphragms 12 and the frame members of the chassis descend into load transmitting engagement with the bumper units B, after which the vehicle is chained down on the haul-away vehicle.

As shown in FIGURE 3, while spring 17 is not contacted, it is compressed when the load is applied to end wall portion 32 of the bag 18 and the elastic side walls 31 are further expanded out between the convolutions of spring 17. Under road shock and consequent further relative compression of chassis frame member 13 and lower control arm 10, there is, of course, further compression of spring 17 and bag 18. However, obviously the shock will be cushioned by the assembly, which functions as a high and variable rate spring which is immediately responsive to the rate of imposition of loads. Since there is no attachment of the one end of the unit to a frame member, the spring will not be axially extended beyond its yield point and a spring which is heavy enough to withstand buckling under the considerable compressive forces which the units B alone must resist can be employed.

While for purposes of illustration a shipping bumper assembly has been shown, as noted, on the lower control arm 10, it will be clear that in some applications it may be inverted and mounted in position on frame member 13. It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

What I claim is:

1. A pair of spaced apart, relatively movable chassis and running gear members movable toward and away from one another; deflatable means normally supporting said members in spaced relation; a coil spring arranged to extend from one of said members toward the other of said members; means securing said spring to one of said members only; an inflatable, hollow envelope of substantially the internal diameter of the spring having an air chamber bounded by spaced apart end walls and elastic side walls disposed within said spring with the spring and one end wall of said envelope being spaced from and free of connection with the said other of said members so that the said other of said members is free to move away from said spring and envelope; means communicating with the interior of said envelope for inflating the latter with a compressible fluid to cause the side walls of said envelope to assume a generally undulating configuration comprising alternate nodes and roots; the said one end wall being substantially inexpansible when the envelope is inflated; said roots receiving individual convolutions of said coil spring and said nodes protruding a substantial distance between adjacent convolutions of said spring to provide yieldable supporting areas for individual convolutions of said spring.

2. A pair of spaced apart, relatively movable members movable toward and away from one another; a coil spring axially arranged crosswise to said members and connected at one end to one of said members, the other end of said spring being spaced from and free from connection with said other member and having relative movement therewith; an inflatable hollow bag assembly within said spring having end walls and elastic side walls, the end of said bag assembly remote from said member to which the spring is connected being substantially rigid in character relative to said side walls; and means communicating with the interior of said bag assembly for inflating the bag assembly with a fluid under pressure.

3. In a shipping bumper assembly for use between a pair of relatively movable members such as chassis and running gear members of a vehicle suspension system for yieldably maintaining them in spaced apart relation; a coil spring axially arranged crosswise to said members with its end convolutions opposite said members, one end of said spring being connected to one of said members and the other end terminating a spaced distance from the other member and free thereof; an inflatable bag having a chamber bounded by end wall portions and elastic side walls secured in position within said spring, and having an end wall portion projecting a substantial distance beyond said end of the spring which is free of said other member; said projecting end wall portion of said bag being substantially inexpandable under the influence of pressure fluid in said chamber; and means communicating with the chamber of said bag for inflating the bag with a fluid under pressure and expanding said side walls.

4. In a shipping bumper assembly for use between a pair of relatively movable members such as chassis and running gear members of a vehicle suspension system for yieldably maintaining them in spaced apart relation; a coil spring axially arranged crosswise to said members; one end of said spring being connected to one of said members and the other end being normally spaced axially from the other members and free of connection therewith; an inflatable, hollow, generally cylindrical, rubber bag of the internal diameter of the spring connected to said one of said members and disposed axially within said spring; said bag having a chamber bounded by elastic side walls, an end wall portion in engagement with said one member, and a substantially inexpandable end wall portion of substantial thickness projecting a substantial distance from said spring toward said other member but free of connection thereto; said bag being inflated with compressible fluid to expand the side walls of said envelope so that they assume a general undulating configuration comprising alternate nodes and roots under the influence of said spring; said roots receiving individual convolutions of said coil spring and said nodes protruding a substantial distance between adjacent convolutions of said spring to provide yieldable supporting areas for individual convolutions of said spring.

5. In a suspension assembly a pair of relatively movable members; an elongate coil spring; an inflatable, hollow envelope of substantially the internal diameter of the spring having a chamber bounded by spaced apart end walls and elastic side walls disposed within said spring; a mounting plate for said spring at one end thereof secured to one of said members, the other end of said spring being spaced from and free of the other member so that the said other member is movable relative thereto; means communicating with the interior of the envelope for inflating the latter with a fluid under pressure to cause the side walls of the envelope to expand between the convolutions of the spring; the end wall of said bag remote from said plate comprising a relatively rigid, inexpansible section with a portion thereof laterally braced by and bracing the end convolution of the spring and spacing it from said other member.

6. In a shipping bumper assembly; an elongate coil spring; an inflatable, cylindrical, hollow bag within said spring having a fluid pressure chamber bounded by end walls and elastic side walls; a mount base for said spring at one end thereof; the one end wall of said bag remote from said base being of such thickness as to be inexpansible under the pressure in said chamber; means communicating with the interior of the bag for inflating the bag with a fluid under pressure; the inexpansible end wall projecting axially outwardly from said spring but having a portion thereof laterally braced by the end convolution of the spring.

7. In a shipping bumper assembly; an elongate coil spring; an inflatable, cylindrical, hollow bag within said spring having a fluid pressure chamber bounded by end portions and elastic side walls; one end portion of said bag being substantially inexpansible under pressure in said chamber; means communicating with the interior of the bag for inflating the bag with fluid under pressure; the substantially inexpansible end portion projecting axially outwardly from said spring but having a portion thereof laterally braced by the end convolution of the spring.

References Cited in the file of this patent

UNITED STATES PATENTS

| | | |
|---|---|---|
| 2,391,120 | Berthelmann | Dec. 18, 1945 |
| 2,703,718 | Hutchinson | Mar. 8, 1955 |
| 2,710,184 | Pemberton | June 7, 1955 |

FOREIGN PATENTS

| | | |
|---|---|---|
| 362,365 | France | Apr. 4, 1906 |